United States Patent
Tomonaga et al.

(10) Patent No.: US 7,817,209 B2
(45) Date of Patent: Oct. 19, 2010

(54) VIDEO SIGNAL PROCESSING DEVICE AND VIDEO SIGNAL PROCESSING METHOD

(75) Inventors: Eiichiro Tomonaga, Tokyo (JP); Himio Yamauchi, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1085 days.

(21) Appl. No.: 11/512,172

(22) Filed: Aug. 30, 2006

(65) Prior Publication Data

US 2007/0046825 A1 Mar. 1, 2007

(30) Foreign Application Priority Data

Aug. 31, 2005 (JP) ............... 2005-252036

(51) Int. Cl.
*H04N 9/78* (2006.01)
(52) U.S. Cl. .................................... 348/669
(58) Field of Classification Search .................. None
See application file for complete search history.

(56) References Cited

U.S. PATENT DOCUMENTS

| 5,373,328 | A | * | 12/1994 | Hong | 348/668 |
| 5,400,083 | A | * | 3/1995 | Mizusawa | 348/620 |
| 5,502,509 | A | | 3/1996 | Kurashita et al. | |
| 5,969,777 | A | * | 10/1999 | Mawatari | 375/240.26 |
| 6,718,069 | B2 | * | 4/2004 | Mollov et al. | 382/265 |
| 7,324,163 | B2 | * | 1/2008 | Bacche | 348/663 |
| 7,420,624 | B2 | * | 9/2008 | Lin et al. | 348/663 |
| 2005/0088574 | A1 | | 4/2005 | Suzuki et al. | |

FOREIGN PATENT DOCUMENTS

| JP | 10-308951 | 11/1998 |
| JP | 2004-128936 | 4/2004 |

* cited by examiner

*Primary Examiner*—Paulos M Natnael
(74) *Attorney, Agent, or Firm*—Finnegan, Henderson, Farabow, Garrett & Dunner, L.L.P.

(57) ABSTRACT

A buffer delays an input luminance signal by a 1-frame period. A screen unit motion detection section determines whether an image indicated by the input luminance signal is a moving image or a static image by a screen unit, and outputs a gradual determination result from the static image to the moving image. A subtracter outputs a differential signal obtained by subtracting the input luminance signal from the luminance signal delayed by the 1-frame period. A pixel unit motion detector detects motion of a pixel unit and outputs a detection result by using a plurality of level values within a predetermined range. A limiter limits the differential signal in accordance with the determination result of the screen unit motion detector. An adder adds an output signal of the multiplier and the input luminance signal together.

10 Claims, 5 Drawing Sheets

US 7,817,209 B2

VIDEO SIGNAL PROCESSING DEVICE AND VIDEO SIGNAL PROCESSING METHOD

CROSS-REFERENCE TO RELATED APPLICATIONS

This application is based upon and claims the benefit of priority from Japanese Patent Application No. 2005-252036, filed Aug. 31, 2005, the entire contents of which are incorporated herein by reference.

BACKGROUND

1. Field

The present invention relates to a video signal processing device which removes a dot interference signal component mixed in a luminance signal and a cross color signal component mixed in a color signal, the luminance signal and the color signal being obtained by separating the video signal.

2. Description of the Related Art

In a composite vide signal of a standard television system such as an NTSC system or a PAL system, luminance and color signals are multiplexed, and a composite signal input to a display device such as a television is separated into a luminance signal and a color signal. During this separation process, unless the separation is complete, the color signal is mixed (left) in the luminance signal, and the luminance signal is mixed in the color signal. The color signal mixed in the luminance signal is called a dot interference signal, and the luminance signal mixed in the color signal is called a cross color signal. These dot interference and cross color signals greatly reduce quality of the video signal.

In a digital broadcast that has recently gained in popularity, such a phenomenon occurs. For example, when content recorded in an analog signal form is digitized to be broadcast, the broadcast digital signal itself may contain a dot interference signal or a cross color signal. Even when such a digital video signal is received to be converted into an analog video signal, a dot interference signal or a cross color signal is contained in the converted analog video signal.

Jpn. Pat. Appln. KOKAI Publication No. 2004-128936 discloses a device for removing a cross color signal from a color signal. The cross color removing device described in this Publication is configured in such a manner that it executes moving image/static image determination based on a difference between frames of luminance signals, and a cross color removing circuit is operated only when a static image is determined. According to this configuration, the cross color removing circuit takes only two states, i.e., operated and unoperated states. Consequently, there has been a problem of impossibility of executing fine control in accordance with an amount of motion.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, there is provided a video signal processing device to remove a dot interference signal from a luminance signal obtained by separating a video signal having luminance and color signals multiplexed therein, comprising: a buffer section which delays an input luminance signal by a 1-frame period; a screen unit motion detection section which detects motion in an image indicated by the input luminance signal based on the input luminance signal and the luminance signal delayed by the 1-frame period, determines whether the image is a moving image or a static image by a screen unit, and outputs a gradual determination result from the static image to the moving image; a subtraction section which outputs a differential signal obtained by subtracting the input luminance signal from the luminance signal delayed by the 1-frame period; a pixel unit motion detection section which detects motion of a pixel unit in one screen based on the differential signal output from the subtraction section and a determination result of the screen unit motion detection section, and outputs a detection result by using a plurality of level values within a predetermined range; a limiting section which limits the differential signal output from the subtraction section in accordance with the determination result of the screen unit motion detection section; a multiplication section which multiplies an output signal of the limiting section by a detection result of the pixel unit motion detection section; and an adder which adds an output signal of the multiplication section and the input luminance signal together.

The preferred embodiments of the present invention will now be described below in detail with reference to the accompanying drawings.

First Embodiment

Figure 1:
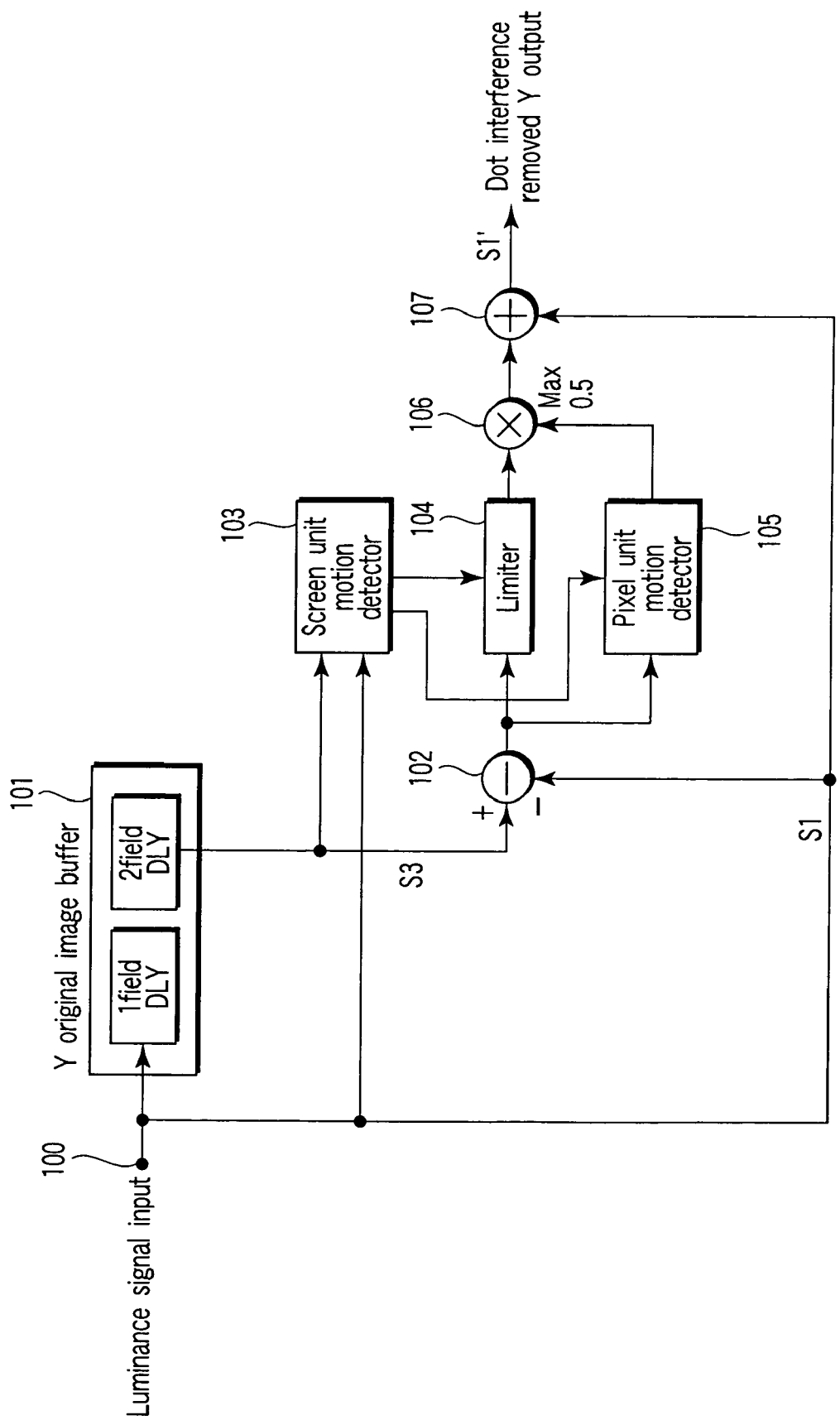
FIG. 1 is a block diagram showing a circuit for removing a dot interference signal component according to a first embodiment of the present invention.

FIG. 1 is a block diagram showing a circuit for removing a dot interference signal component mixed in a luminance signal according to a first embodiment of the present invention.

A luminance signal (Y) containing a dot interference signal component is input from an input terminal 100. This luminance signal is a luminance signal obtained by separating a received composite signal or a luminance signal received as a component signal. When the luminance signal obtained by separating the composite signal is received as a component signal, a dot interference signal component may be contained in the component signal.

This input luminance signal is output to a frame buffer (Y original signal buffer) 101, a differentiator 102, a screen unit motion detector 103, an adder 107. In the frame buffer 101, the input luminance signal is delayed by a 1-frame period (2-field period) to be output to the differentiator 102 and the screen unit motion detector 103. The differentiator 102 calculates a difference value between the input luminance signal and the signal delayed by the 1-frame period to output it to a limiter 104 and a pixel unit motion detector 105.

The screen unit motion detector 103 determines whether a video of the input luminance signal is a static image or a moving image by one screen (frame) unit based on the input luminance signal and the signal delayed by the 1-frame period, and outputs this determination result to the limiter 104 and the pixel unit motion detector 105. The determination result is a value changed in stages from the static image to the moving image. The screen unit motion detector 103 outputs the determination result by using level values of two or more stages. The determination operation of the static image/moving image by the screen unit motion detector 103 will be described below.

The limiter 104 controls a value of a pixel differential signal from the differentiator 102 by using the static image/moving image determination result of the screen unit motion detector 103. The limiter 104 directly outputs the differential signal if the input image is determined to be a static image, and limits a differential signal value in accordance with a size of motion if the input image is determined to be a moving image. The limiter 104 limits an output signal value to a smaller value as an amount of motion (differential signal value) is larger. This limit value changes by one screen unit. The signal thus controlled is output to a multiplier 106.

The pixel unit motion detector 105 determines whether the pixel has moved within a 1-frame period (pixels constituting a moved image) based on the differential value between the input luminance signal and the signal delayed by one frame. A determination result is represented by level values of two stages or more, and output as a multiplication coefficient of the multiplier 106. The pixel unit motion detector 105 outputs this multiplication coefficient as, e.g., a value gradually changed from a maximum 0.5 to a minimum 0.

The pixel unit motion detector 105 sets the multiplication coefficient to a maximum value 0.5 if it is determined that the differential value is small and the pixel has not moved, and the multiplication coefficient to be small depending on a size of the differential value if the pixel is determined to have moved. In other words, the multiplication coefficient approaches a minimum value 0 as the differential value is larger. When the static image/moving image determination result of the screen unit motion detector 103 is used, and the image is determined to be a static image in entire one input screen, the pixel unit motion detector 105 forcibly sets the multiplication coefficient to a maximum value 0.5.

The multiplier 106 multiplies the pixel differential value input from the limiter 104 by the multiplication coefficient output from the pixel unit motion detector 105, and outputs its result to the adder 107. The adder 107 adds the input luminance signal and the multiplication result of the multiplier 106 together to output a luminance signal from which a dot interference component has been removed. The output signal is represented by the following equation:

$$S1'=S1+\alpha(S3-S1)$$

In this case, S1 is an input luminance signal, S3 is a signal delayed by the 1-frame period, and S1' is an output signal from which a dot interference component has been removed. α is a value decided based on a determination result of screen unit motion detection, a determination result of pixel unit motion detection, and a limit value of the limiter 104, its maximum value is 0.5, and its minimum value is 0.

As described above, when the dot interference signal is removed, by controlling the coefficient α by which a pixel interframe differential signal (S3−S1) is multiplied in accordance with the pixel unit motion detection determination and the screen unit motion detection result, it is possible to remove the dot interference signal with higher accuracy.

Figure 2:
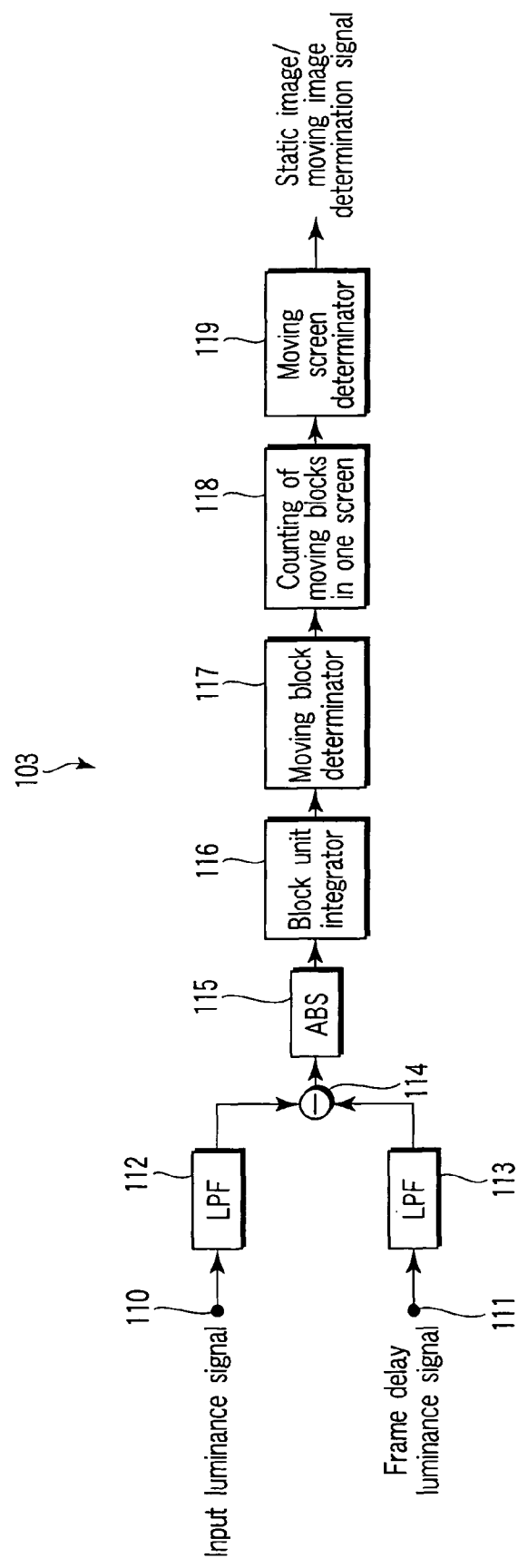
FIG. 2 is a block diagram showing a configuration example of a screen unit motion detector in the dot interference removing circuit of FIG. 1.

FIG. 2 is a block diagram showing a configuration example of the screen unit motion detector 103 in the dot interference removing circuit of FIG. 1.

The luminance signal that has been input to the input terminal 110 is input to a subtracter 114 after a high frequency component is filtered through a low-pass filter (LFP) 112. The luminance signal delayed by the 1-frame period and input to an input terminal 111 is input to the subtracter 114 after a high frequency component is filtered through a low-pass filter (LPF) 113.

The substracter 114 subtracts the luminance signal delayed by the 1-frame period from the input luminance signal, and outputs a differential value obtained by this subtraction to an absolute value calculator 115. The absolute value calculator (ABS) 115 calculates an absolute value of the differential value to output it to a block unit integrator 116.

The block unit integrator 116 integrates the absolute value of the differential value by a block unit of a predetermined size, e.g., 16 horizontal pixels and 4 vertical pixels, in one screen, and calculates difference information in a 1-frame period of the block to output it to a moving block determinator 117. The moving block determinator 117 compares the input integration value with a predetermined threshold value to determine whether the moving block is a static or moving image, and outputs this determination result to an in-one block moving block counter 118.

The in-one block moving block counter 118 counts the input static/moving image determination of the block unit for a 1-frame period, and outputs this count value to a moving screen determinator 119. The moving screen determinator 119 determines whether a frame is a static or moving image based on the static/moving image determination result of the block unit counted for a 1-frame period, and outputs this determination signal. For example, the moving screen determinator 119 compares the output count value of the in-one screen moving block counter 118 with a plurality of threshold values, and outputs a determination result compliant with the count value by using level values of two stages or more.

As described above, according to the first embodiment of the present invention, in the dot interference removing circuit, the static image/moving image is more precisely determined by using the pixel unit motion detector and the screen unit motion detector. As a result, finer control can be carried out in accordance with pictures to improve effects of the dot interference removal.

Second Embodiment

Figure 3:
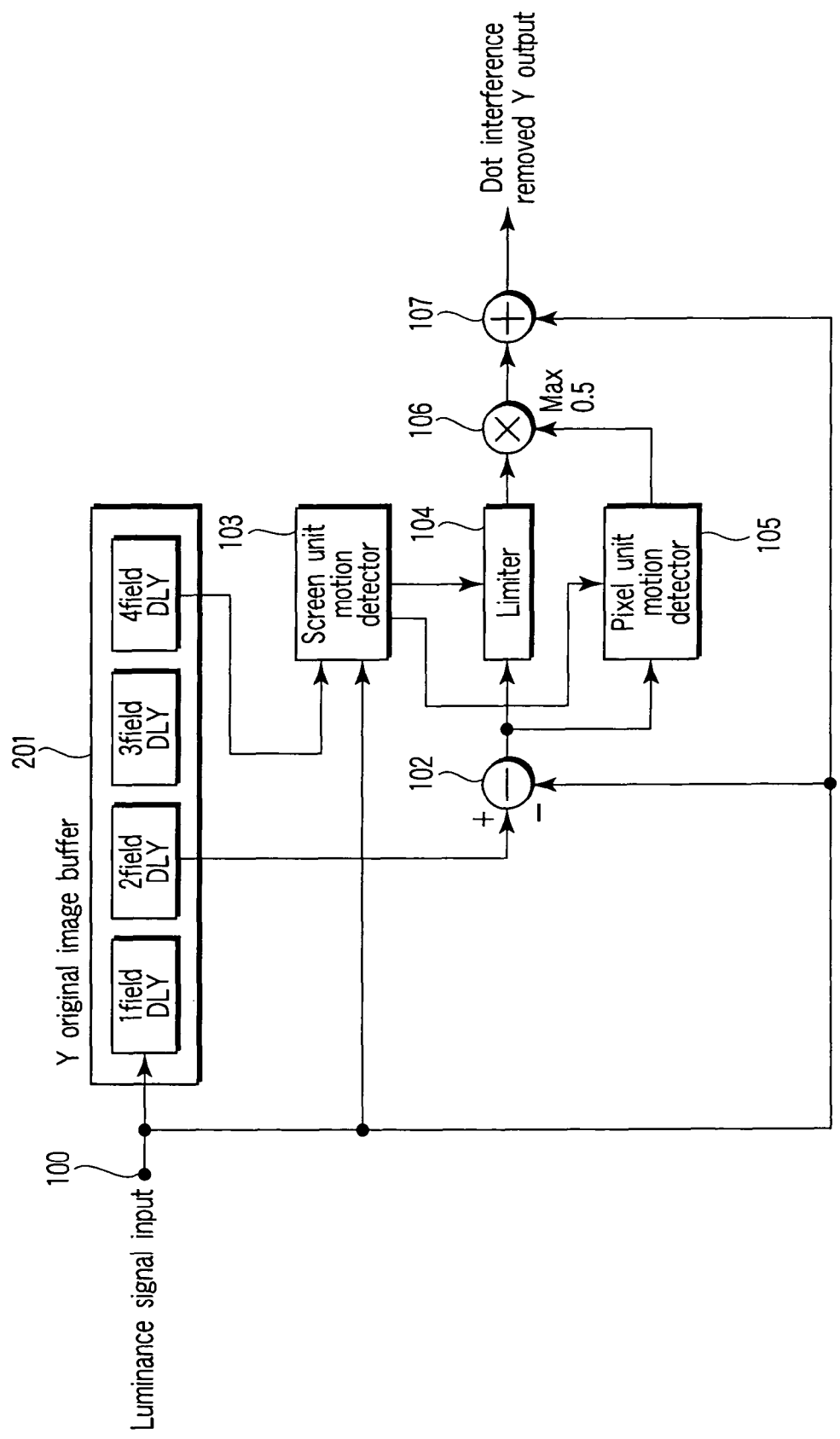
FIG. 3 is a block diagram showing a circuit for removing a dot interference signal component according to a second embodiment of the present invention.

FIG. 3 is a block diagram showing a circuit for removing a dot interference signal component mixed in a luminance signal according to a second embodiment of the present invention.

The second embodiment is different from the first embodiment of FIG. 1 in that an input luminance signal is delayed double, i.e., by a 2-frame period, at a frame buffer (Y original image buffer) 201. By setting the delay to the 2-frame (4 fields) period, it is possible to make a phase of the dot interference component of the luminance signal equal between the input luminance signal and the delay signal. Accordingly, through the same process as that of the first embodiment by using the frame buffer 201 as shown in FIG. 3, it is possible to more accurately remove the dot interference component.

According to the second embodiment, as compared with the first embodiment, 2 more fields of a memory capacity of the image buffer is necessary. Hence, the second embodiment is suitably used for a system which has a sufficient memory capacity.

Thus, according to the second embodiment of the present invention, the luminance signal is delayed by one frame more, and the phase of the dot interference component is made equal between the original signal (input luminance signal) and the delay signal to detect motion. As a result, it is possible to improve effects of the dot interference removal more than the first embodiment.

Third Embodiment

Figure 4:
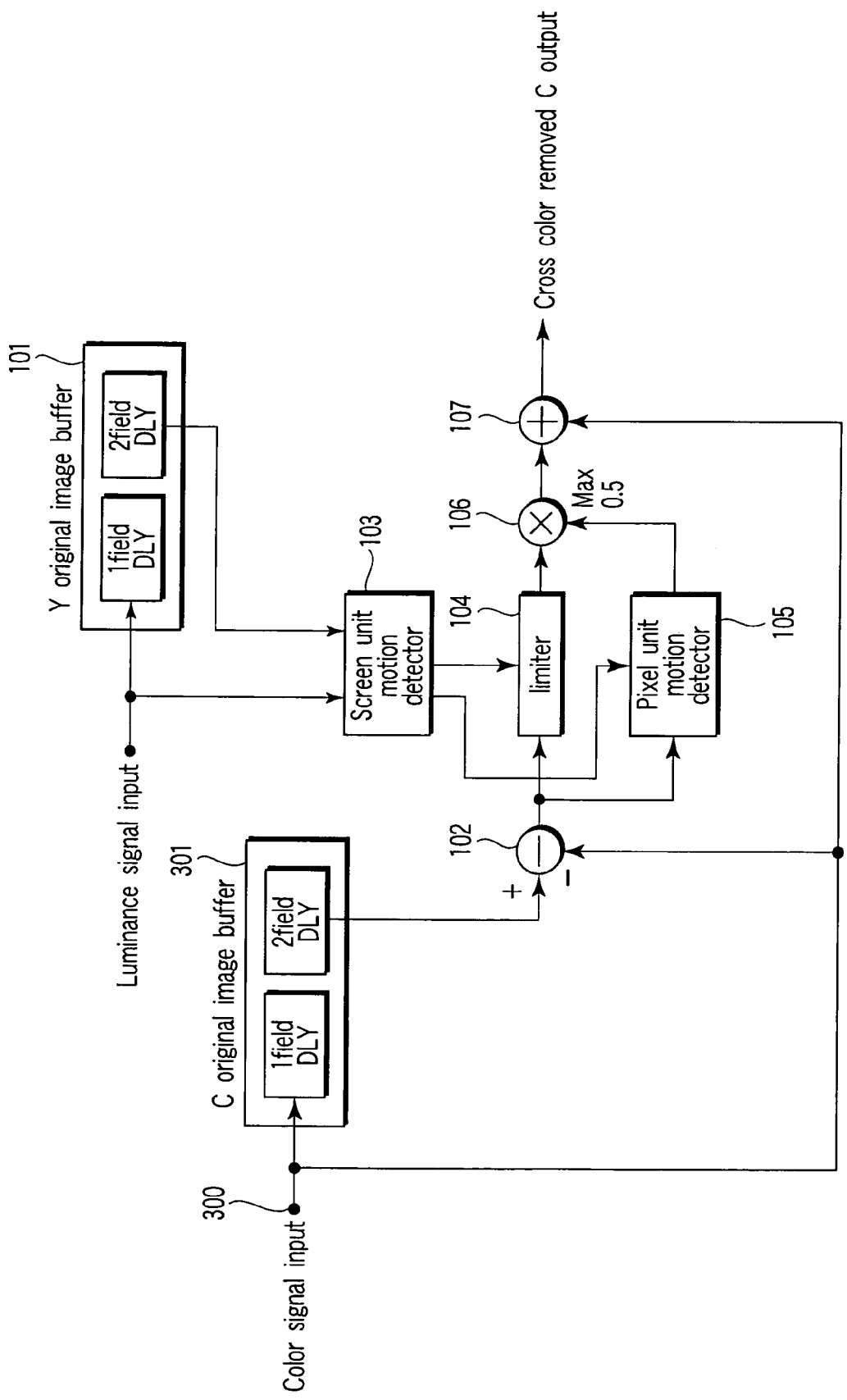
FIG. 4 is a block diagram showing a circuit for removing a cross color signal component according to a third embodiment of the present invention.

FIG. 4 is a block diagram showing a circuit for removing a cross color signal component mixed in a color (C) signal according to a third embodiment of the present invention. Components similar to those of the first embodiment are denoted by similar reference numerals.

A color signal containing a cross color signal component is input from an input terminal 300. This color signal is a color signal obtained by separating a composite signal, or a color signal input as a component signal. The input color signal is output to a frame buffer (C original signal buffer) 301, a differentiator 102, and an adder 107. At the frame buffer 301, the input color signal is delayed by a 1-frame period (2-field period) to be output to the differentiator 102. The differentiator 102 calculates a differential value between the input color signal and the signal delayed by the 1-frame period to output it to a limiter 104 and a pixel unit motion detector 105.

Operations of a frame buffer 101, a screen unit motion detector 103, the limiter 104, the pixel unit motion detector 105, a multiplier 106, and the adder 107 are similar to those of the first embodiment. The adder 107 adds the input color signal and a multiplication result of the multiplier 106 together, and outputs a color signal from which a cross color component has been removed.

Thus, according to the third embodiment, in the cross color removing circuit, calculation of a coefficient by which a pixel interframe differential signal is multiplied is controlled in accordance with pixel unit motion detection determination and screen unit motion detection results. As a result, a static image/moving image can be more precisely determined, and finer control can be carried out in accordance with pictures, thereby improving effects of the cross color removal.

Fourth Embodiment

Figure 5:
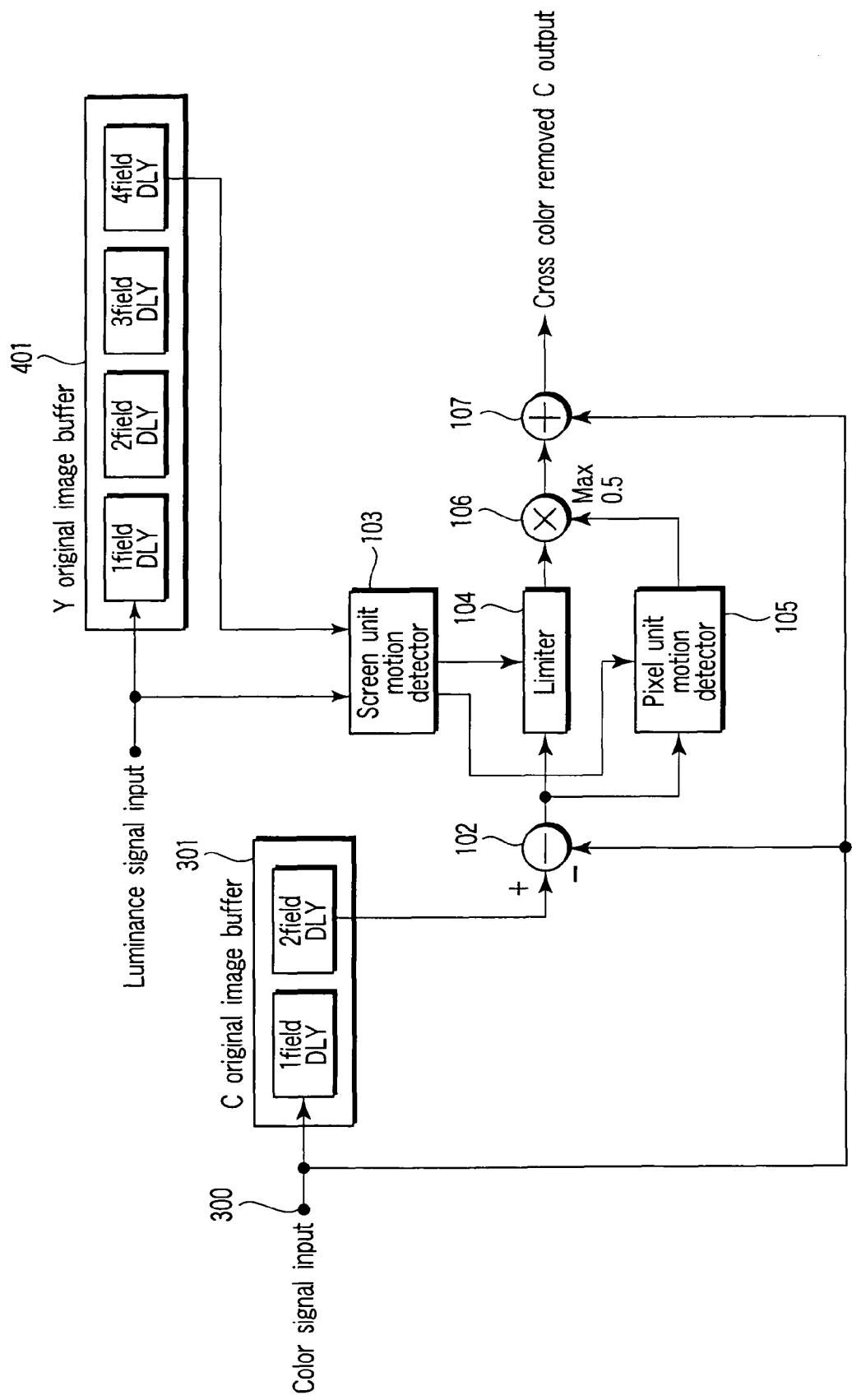
FIG. 5 is a block diagram showing a circuit for removing a cross color signal component according to a fourth embodiment of the present invention.

FIG. 5 is a block diagram showing a circuit for removing a cross color signal component mixed in a color signal according to a fourth embodiment of the present invention. The fourth embodiment is different from the third embodiment of FIG. 4 in that an input luminance signal is delayed double, i.e., by a 2-field period, at a frame buffer (Y original image buffer) 401.

By setting the delay to the 2-frame period, phases of dot interference and cross color components can be made equal between the original signal and the delay signal. Thus, as shown in FIG. 5, through the same process as that of the first embodiment by using the frame buffer 401, the cross color component can be more accurately removed.

Thus, according to the fourth embodiment, effects of the cross color signal removal can be improved as in the case of the third embodiment. Moreover, as the signal delayed by one frame more is used for determination, the phase of the color signal can be made equal between the original signal and the delay signal, thereby obtaining higher effects.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A video signal processing device to remove a dot interference signal from a luminance signal obtained by separating a video signal having luminance and color signals multiplexed therein, comprising:

a buffer section which delays an input luminance signal by a 1-frame period;

a screen unit motion detection section which detects motion in an image indicated by the input luminance signal based on the input luminance signal and the luminance signal delayed by the 1-frame period, determines whether the image is a moving image or a static image by a screen unit, and outputs a gradual determination result from the static image to the moving image;

a subtraction section which outputs a differential signal obtained by subtracting the input luminance signal from the luminance signal delayed by the 1-frame period;

a pixel unit motion detection section which detects motion of a pixel unit in one screen based on the differential signal output from the subtraction section and a determination result of the screen unit motion detection section, and outputs a detection result by using a plurality of level values within a predetermined range;

a limiting section which limits the differential signal output from the subtraction section in accordance with the determination result of the screen unit motion detection section;

a multiplication section which multiplies an output signal of the limiting section by a detection result of the pixel unit motion detection section; and an adder which adds an output signal of the multiplication section and the input luminance signal together.

2. The video signal processing device according to claim 1, wherein the screen unit motion detection section comprises:

a subtraction section which subtracts the luminance signal obtained by delaying the input luminance signal by the 1-frame period from the same, an absolute value calculation section which calculates an absolute value of an output signal of the subtraction section, a block unit integration section which integrates the absolute value calculated by the absolute value calculation section by a predetermined block unit, a moving image block determination section which compares an output integration value of the block unit integration section with a predetermined threshold value to determine whether a block is a moving image block, a moving image block counting section which counts blocks determined to be moving image blocks by the moving image block determination section in one screen, and outputs the number of moving blocks in one screen, and a moving image screen determination section which determines whether the blocks are static images or moving images based on the number of moving image blocks of one screen output from the moving image block counting section, and outputs the gradual determination result.

3. The video signal processing device according to claim 1, wherein:
the pixel unit motion detection section outputs a maximum value within the predetermined range as the detection result when the screen unit motion detection section determines the input signal to be a static image, and
the limiting section does not limit the differential signal output from the subtraction section when the screen unit motion detection section determines the input signal to be a static image, but limits the differential signal to a smaller value as the determination result of the screen unit motion detection section is closer to a determination result indicating a moving image.

4. The video signal processing device according to claim 1, wherein the buffer section includes a buffer section to delay the input luminance signal by a 2-frame period, and the screen unit motion detection section determines whether an image indicated by the input luminance signal is a moving image or a static image based on the input luminance signal and the signal delayed by the 2-frame period.

5. A video signal processing device to remove a cross color signal from a color signal obtained by separating a video signal having luminance and color signals multiplexed therein, comprising:
a buffer section which delays an input luminance signal by a 1-frame period;
a color signal buffer section which delays an input color signal by a 1-frame period;
a screen unit motion detection section which determines whether an image indicated by the input luminance signal is a moving image or a static image by a screen unit based on the input luminance signal and the luminance signal delayed by the 1-frame period, and outputs a gradual determination result from the static image to the moving image;
a subtraction section which outputs a differential signal obtained by subtracting the input color signal from the color signal delayed by the 1-frame period by the color signal buffer section;
a pixel unit motion detection section which detects motion of a pixel unit in one screen based on the differential signal output from the subtraction section and a determination result of the screen unit motion detection section, and outputs a detection result by using a plurality of level values within a predetermined range;
a limiting section which limits the differential signal output from the subtraction section in accordance with the determination result of the screen unit motion detection section;
a multiplication section which multiplies an output signal of the limiting section by a detection result of the pixel unit motion detection section; and
an adder which adds an output signal of the multiplication section and the input color signal together.

6. The video signal processing device according to claim 5, wherein the screen unit motion detection section comprises:
a subtracter which subtracts the luminance signal obtained by delaying the input luminance signal by the 1-frame period from the same,
an absolute value calculation section which calculates an absolute value of an output signal of the subtraction section,
a block unit integration section which integrates the absolute value calculated by the absolute value calculation section by a predetermined block unit,
a moving image block determination section which compares an output integration value of the block unit integration section with a predetermined threshold value to determine whether a block is a static image or a moving image,
a moving image block counting section which counts blocks determined to be moving image blocks by the moving image block determination section in one screen, and outputs the number of moving blocks in one screen, and
a moving image screen determination section which determines whether the blocks are static images or moving images based on the number of moving image blocks of one screen output from the moving image block counting section, and outputs the gradual determination result.

7. The video signal processing device according to claim 5, wherein:
the pixel unit motion detection section outputs a maximum value within the predetermined range as the detection result when the screen unit motion detection section determines the input signal to be a static image, and
the limiting section does not limit the differential signal output from the subtraction section when the screen unit motion detection section determines the input signal to be a static image, but limits the differential signal to a smaller value as the determination result of the screen unit motion detection section is closer to a determination result indicating a moving image.

8. The video signal processing device according to claim 5, wherein the buffer section includes a buffer section to delay the input luminance signal by a 2-frame period, and the screen unit motion detection section determines whether an image indicated by the input luminance signal is a moving image or a static image based on the input luminance signal and the signal delayed by the 2-frame period.

9. A video signal processing method to remove a dot interference signal from a luminance signal obtained by separating a video signal having luminance and color signals multiplexed therein, comprising:
delaying an input luminance signal by a 1-frame period;
detecting motion in an image indicated by the input luminance signal based on the input luminance signal and the luminance signal delayed by the 1-frame period, determining whether the image is a moving image or a static image by a screen unit, and outputting a gradual determination result from the static image to the moving image;
outputting a differential signal obtained by subtracting the input luminance signal from the luminance signal delayed by the 1-frame period;
detecting motion of a pixel unit in one screen based on the differential signal and a determination result of the screen unit motion detection, and outputting a detection result by using a plurality of level values within a predetermined range;
limiting the differential signal in accordance with the determination result of the screen unit motion detection section; and
multiplying the limited differential signal by a detection result of the pixel unit motion detection to add together a result of the multiplication and the input luminance signal.

10. The method according to claim 9, wherein the determination as to whether the image is a moving image or a static image by a screen unit comprises:

subtracting the luminance signal obtained by delaying the input luminance signal by the 1-frame period from the same to calculate an absolute value of a result of the subtraction, integrating the absolute value calculated by the absolute value calculation by a predetermined block unit, and comparing an integration value with a predetermined threshold value to determine whether a block is a moving image block, and counting blocks determined to be moving image blocks by the moving image block determination in one screen, and determining whether the screen shows a static image or a moving image based on the number of moving image blocks of one screen to output the gradual determination result.

* * * * *